US011303817B2

(12) United States Patent
Arai (10) Patent No.: US 11,303,817 B2
(45) Date of Patent: Apr. 12, 2022

(54) ACTIVE SENSOR, OBJECT IDENTIFICATION SYSTEM, VEHICLE AND VEHICLE LAMP

(71) Applicant: KOITO MANUFACTURING CO., LTD., Tokyo (JP)

(72) Inventor: Kensuke Arai, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 0 days.

(21) Appl. No.: 16/727,045

(22) Filed: Dec. 26, 2019

(65) Prior Publication Data

US 2020/0213499 A1 Jul. 2, 2020

(30) Foreign Application Priority Data

Dec. 27, 2018 (JP) .............................. JP2018-244919

(51) Int. Cl.
*H04N 5/235* (2006.01)
*B60R 11/04* (2006.01)
*G06K 9/00* (2022.01)
*B60Q 1/04* (2006.01)

(52) U.S. Cl.
CPC ............. *H04N 5/2352* (2013.01); *B60Q 1/04* (2013.01); *B60R 11/04* (2013.01); *G06K 9/00791* (2013.01)

(58) Field of Classification Search
CPC ......... B60Q 1/0023; B60Q 1/04; B60R 11/04; G06K 9/00791; G06K 9/00805; G06K 9/2027; H04N 5/217; H04N 5/2352
See application file for complete search history.

(56) References Cited

U.S. PATENT DOCUMENTS

| 6,876,392 B1* | 4/2005 | Uomori .................. G01S 7/481 348/347 |
| 2002/0075691 A1* | 6/2002 | Couillaud ............ B60Q 1/0023 362/465 |
| 2003/0169213 A1* | 9/2003 | Spero .................. G02B 27/0093 345/7 |
| 2004/0085448 A1* | 5/2004 | Goto ....................... G01S 17/04 348/148 |
| 2004/0144911 A1* | 7/2004 | Stam .................. G06K 9/00791 250/208.1 |
| 2005/0040333 A1* | 2/2005 | Fleury .................. G06K 9/2018 250/332 |

(Continued)

FOREIGN PATENT DOCUMENTS

| EP | 3396410 A1 | 10/2018 |
| JP | 2006011671 A | 1/2006 |

(Continued)

OTHER PUBLICATIONS

Communication dated Sep. 16, 2021 issued by the Institut National De La Propriete Industrielle in application No. FR1915483.

*Primary Examiner* — Peter D Le
(74) *Attorney, Agent, or Firm* — Sughrue Mion, PLLC (57) ABSTRACT

An active sensor includes a light projector configured to emit probe light, and an image sensor. The active sensor is configured to obtain a first image in a light emitting state of the light projector and a second image in a non-light emitting state of the light projector. The second image can be used for correcting the first image.

9 Claims, 10 Drawing Sheets

(56) References Cited

U.S. PATENT DOCUMENTS

| | | | |
|---|---|---|---|
| 2005/0057650 A1* | 3/2005 | Kogane | H04N 5/238 348/143 |
| 2005/0074221 A1* | 4/2005 | Remillard | H04N 5/33 385/147 |
| 2006/0228003 A1* | 10/2006 | Silverstein | G01S 17/04 382/115 |
| 2008/0007429 A1* | 1/2008 | Kawasaki | G08G 1/167 340/905 |
| 2008/0029701 A1* | 2/2008 | Onozawa | G01S 7/499 250/332 |
| 2008/0186701 A1* | 8/2008 | Omi | G06K 9/2027 362/231 |
| 2008/0266396 A1* | 10/2008 | Stein | H04N 7/183 348/148 |
| 2009/0046894 A1* | 2/2009 | Robert | G06K 9/00805 382/104 |
| 2009/0309710 A1* | 12/2009 | Kakinami | G06K 9/00805 340/435 |
| 2010/0288573 A1* | 11/2010 | Nishina | B60R 11/04 180/272 |
| 2011/0187878 A1* | 8/2011 | Mor | G02B 27/0983 348/218.1 |
| 2012/0062706 A1* | 3/2012 | Keshavmurthy | G01S 17/87 348/47 |
| 2012/0062746 A1* | 3/2012 | Otsuka | G06K 9/00805 348/148 |
| 2012/0154577 A1* | 6/2012 | Yoshikawa | H04N 7/18 348/140 |
| 2012/0281240 A1* | 11/2012 | Cohen | G06K 9/2036 356/610 |
| 2013/0088598 A1 | 4/2013 | Muramatsu et al. | |
| 2013/0131981 A1* | 5/2013 | Hawkinson | G01C 21/165 701/468 |
| 2013/0153651 A1* | 6/2013 | Fedorovskaya | G06K 5/00 235/375 |
| 2013/0155704 A1* | 6/2013 | Takagaki | G06K 9/00825 362/466 |
| 2013/0194390 A1* | 8/2013 | Hirooka | G01C 3/14 348/47 |
| 2013/0201287 A1* | 8/2013 | Chida | H04N 13/254 348/46 |
| 2013/0222237 A1* | 8/2013 | Jesme | G06F 3/0308 345/156 |
| 2013/0235201 A1* | 9/2013 | Kiyohara | G06T 7/20 348/148 |
| 2013/0258108 A1* | 10/2013 | Ono | H04N 7/18 348/148 |
| 2014/0022068 A1* | 1/2014 | Usami | B60Q 1/143 340/436 |
| 2014/0267620 A1* | 9/2014 | Bridges | G01B 21/045 348/46 |
| 2015/0092019 A1* | 4/2015 | Asano | G01B 11/026 348/46 |
| 2015/0109444 A1* | 4/2015 | Zhang | H04N 7/188 348/148 |
| 2015/0294161 A1* | 10/2015 | Schamp | G06K 9/00798 701/37 |
| 2015/0350572 A1* | 12/2015 | Hattori | H04N 5/332 250/332 |
| 2017/0008169 A1* | 1/2017 | Kitamura | G06K 9/00201 |
| 2017/0032531 A1* | 2/2017 | Nagata | H04N 13/254 |
| 2017/0131089 A1* | 5/2017 | Bronstein | H04N 5/2256 |
| 2018/0056854 A1* | 3/2018 | Kunii | G08G 1/096725 |
| 2018/0068190 A1* | 3/2018 | Son | B60W 60/0015 |
| 2018/0075612 A1* | 3/2018 | Michielin | G02B 23/2461 |
| 2018/0130209 A1* | 5/2018 | Price | G01S 17/88 |
| 2018/0176440 A1* | 6/2018 | Chen | H04N 5/2351 |
| 2018/0336691 A1* | 11/2018 | Suzuki | H04N 5/2256 |
| 2019/0004149 A1 | 1/2019 | Mano et al. | |

FOREIGN PATENT DOCUMENTS

| | | |
|---|---|---|
| JP | 2006105848 A | 4/2006 |
| JP | 2009-257983 A | 11/2009 |
| WO | 2017/110413 A1 | 6/2017 |

* cited by examiner

ACTIVE SENSOR, OBJECT IDENTIFICATION SYSTEM, VEHICLE AND VEHICLE LAMP

CROSS-REFERENCE TO RELATED APPLICATIONS

This application is based upon and claims the benefit of priority from Japanese patent application No. 2018-244919, filed on Dec. 27, 2018, the entire contents of which are incorporated herein by reference.

TECHNICAL FIELD

The present disclosure relates to an object identification system.

BACKGROUND ART

An object identification system configured to sense a position and a type of an object around a vehicle is used for automatic driving or automatic control on a light distribution of a headlamp. The object identification system includes a sensor, and a processing device configured to analyze an output of the sensor. The sensor is selected from a camera, a LiDAR (Light Detection and Ranging, Laser Capturing Detection and Ranging), a millimeter wave radar, an ultrasonic sonar and the like, while considering uses, required accuracy and cost.

As the sensor, there are a passive sensor and an active sensor. The passive sensor is configured to detect light emitted from an object or light reflected from environment light by an object, and the sensor itself does not emit light. On the other hand, the active sensor is configured to emit probe light to an object and to detect reflected light thereof. The active sensor mainly includes a light projector (illumination device) configured to emit light to an object, and an image sensor configured to receive reflected light from the object. The active sensor is advantageous over the passive sensor that the active sensor can improve resistance against disturbances by combining a wavelength of the probe light and a sensitivity wavelength region of the image sensor. JP-A-2009-257983 and WO2017/110413 disclose relate-art techniques.

The on-board active sensor is used outdoors. Since wavelengths of sunlight range from ultraviolet to infrared, which overlap the wavelength of the probe light. This means that the sunlight becomes the disturbance to the active sensor. Also, a spectrum of the sunlight, i.e., an intensity of disturbance components changes over time.

An object identification system includes a classifier configured to receive an output image of the active sensor and to classify a position and a type (category) of an object contained in the output image. The classifier has a model which is generated by machine learning using learning data (training data) of an enormous number of images prepared in advance.

In the object identification system, in order to realize a high identification rate irrespective of day and night, it is necessary to use, as the learning data, images captured under various illuminance environments.

SUMMARY

Accordingly, the present disclosure has been made in view of the above circumstances, and an aspect of the present disclosure provides an active sensor having improved noise resistance. Another aspect of the present disclosure improves an identification rate of an object identification system using the active sensor or reduces learning cost.

According to an embodiment of the present disclosure, there is provided an active sensor. The active sensor includes a light projector configured to emit probe light, and an image sensor. The active sensor is configured to obtain a first image in a light emitting state of the light projector and a second image in a non-light emitting state of the light projector. The second image can be used for correcting the first image.

According to the above configuration, the active sensor can improve noise resistance.

DESCRIPTION OF EMBODIMENTS

Overview of Embodiments

An embodiment disclosed herein relates to an active sensor. The active sensor includes a light projector configured to emit probe light, and an image sensor. The active sensor is configured to obtain a first image in a light emitting state of the light projector and a second image in a non-light emitting state of the light projector. The second image can be used for correcting the first image.

The second image containing only disturbance noise is obtained in the non-light emitting state of the probe light from the light projector, and while calculating a difference from the first image containing the disturbance noise and a component of the probe light, an influence of the disturbance noise can be reduced, so that noise resistance can be improved.

A set of the projector and the image sensor may be provided in two sets, and a wavelength may be different between the two sets.

The two sets may be configured to operate in a complementary manner. Therefore, a frame rate can be improved.

Alternatively, only one of the two sets may be enabled to operate. For example, one set of the two sets X and Y in which an identification rate of a classifier is higher, may be selected and enabled to operate, in accordance with a state (i.e., spectrum) of environment light.

The active sensor may further include a controller configured to control a light emitting timing of the light projector and a light exposure timing of the image sensor.

The active sensor may include a gating camera configured to define a plurality of ranges in a depth direction and obtain a plurality of images corresponding to the plurality of ranges by changing a time difference between light emission and image capturing for each of the ranges.

The second image may be obtained for each range. Thereby, the accuracy can be improved.

Alternatively, a common second image may be used for all the ranges. In this case, the lowering in frame rate can be suppressed.

The light projector may be configured to emit (output) infrared light or ultraviolet light.

Another embodiment disclosed herein relates to an object identification system. The object identification system may include the active sensor, and an arithmetic processing device configured to identify a type of an object based on an image obtained by the active sensor.

According to the above configuration, the disturbance noise contained in image data to be input to the classifier is largely reduced. This means that an influence of the disturbance noise on a model of the classifier is reduced. Therefore, labor, time and cost to be consumed for collection of learning data can be reduced.

Embodiments

Hereinbelow, embodiments of the present disclosure will be described with reference to the drawings. The same or equivalent constitutional elements, members and processing shown in the respective drawings are denoted with the same reference signs, and the duplicating descriptions are omitted as appropriate. The embodiments are exemplary and not to limit the invention. All features described in the embodiments and combinations thereof cannot be said as being necessarily essential to the invention.

First Embodiment

Figure 1:
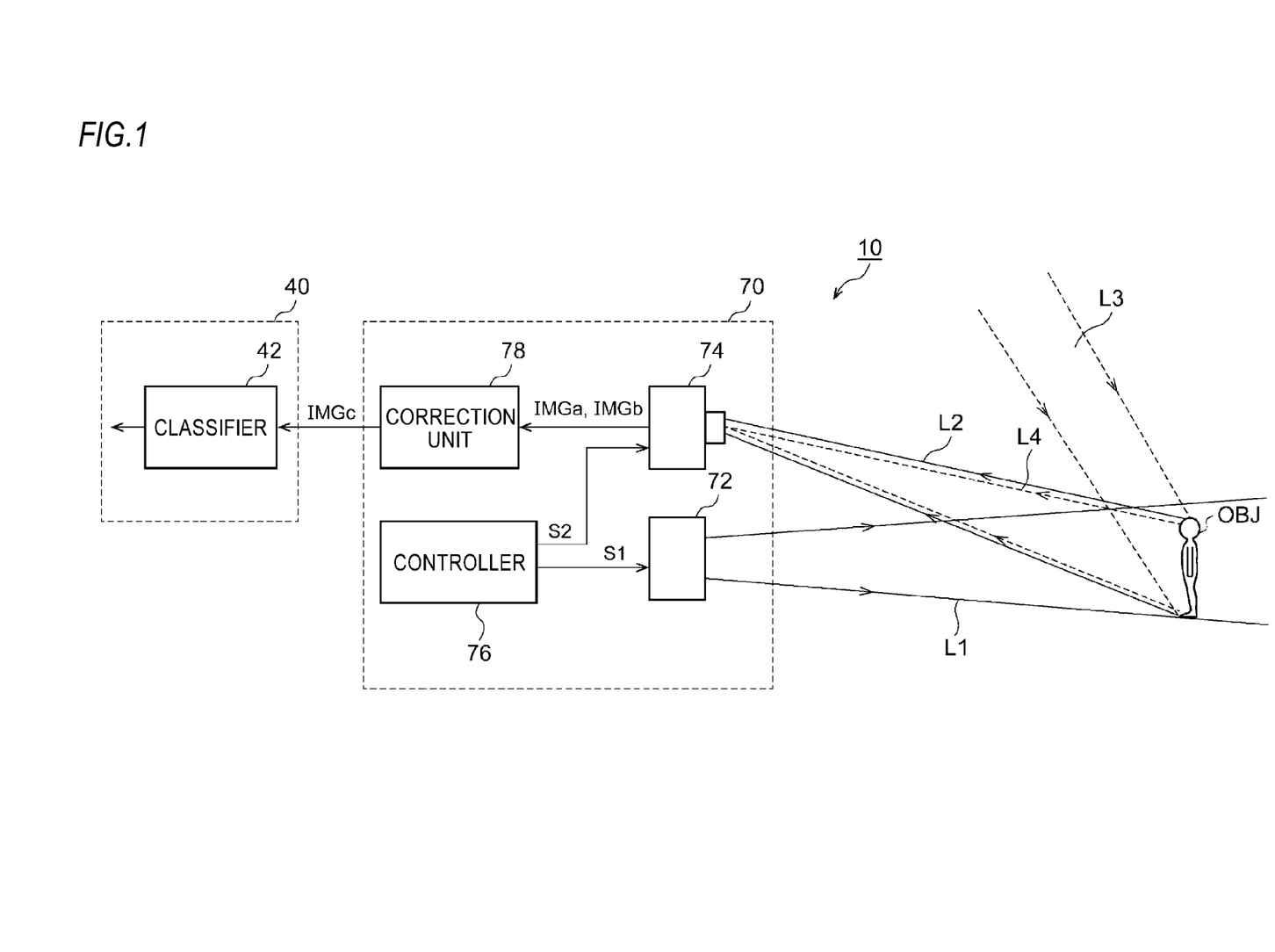
FIG. 1 is a block diagram of an object identification system according to a first embodiment.

FIG. 1 is a block diagram of an object identification system according to a first embodiment. The object identification system 10 is mounted on a vehicle such as an automobile and a motorcycle, and is configured to determine a type (category) of an object OBJ around the vehicle.

The object identification system 10 includes an active sensor 70, and an arithmetic processing device 40. The active sensor 70 is configured to emit probe light L1 toward the object OBJ and to capture reflected light L2 reflected by the object OBJ. The arithmetic processing device 40 is configured to process an output image of the active sensor 70 to determine a position and a type (category) of the object OBJ.

The active sensor 70 includes a light projector 72, an image sensor 74, a controller 76, and a correction unit 78. The light projector 72 is configured to emit the probe light L1 ahead of the vehicle, in synchronization with a light projecting timing signal S1 applied from the controller 76. The probe light L1 is preferably infrared light or ultraviolet light but is not limited thereto. For example, visible light having a predetermined wavelength may be also viable.

The image sensor 74 has sensitivity to the same wavelength as the probe light L1 and is configured to capture the reflected light (return light) L2 reflected by the object OBJ. The image sensor 74 can perform light exposure control in synchronization with a capturing timing signal S2 applied from the controller 76 and is configured to generate an image IMG. An image obtained in a light emitting state of the light projector 72 is referred to as a first image IMGa, and an image obtained in a non-light emitting state of the light projector 72 is referred to as a second image IMGb for distinction. The controller 76 is configured to control the light emitting timing of the light projector 72 and the light exposure timing of the image sensor 74.

Since the object identification system 10 is used outdoors, not only the probe light L1 but also light (environment light) L3 from the sun and a streetlight is irradiated to the object OBJ. Therefore, light L4 reflected from the environment light L3 by the object OBJ is incident on the image sensor 74. Additionally, the environment light L3 may be directly incident on the image sensor 74 depending on a direction of the image sensor 74. Therefore, when a spectrum of the environment light L3 overlaps a sensitivity wavelength of the image sensor 74, the environment light L3 becomes disturbance noise.

In order to reduce an influence of the environment light L3, the object identification system 10 has the following functions.

The active sensor 70 is configured to perform image capturing two times while switching the light projector 72 between the light emitting state and the non-light emitting state, and to obtain the first image IMGa in the light emitting state and the second image IMGb in the non-light emitting state. The first image IMGa can be corrected using the second image IMGb. In the first embodiment, the correction is performed by the correction unit 78 provided in the active sensor 70.

For simplifying the description, it is herein assumed that the exposure of the image sensor 74 is the same between when capturing the first image IMGa and when capturing the second image IMGb. The exposure is determined based on a relation among a shutter speed, a diaphragm, and a sensitivity of the image sensor. In this case, the correction unit 78 is configured to subtract a pixel value of a corresponding pixel of the second image IMGb for each pixel of the first image IMGa to generate a third image IMGc having the pixel values after the subtraction.

The arithmetic processing device 40 can be implemented in a combination of a processor (hardware) such as a CPU (Central Processing Unit), an MPU (Micro Processing Unit) and a microcomputer and a software program to be executed by the processor (hardware). The arithmetic processing device 40 may be a combination of a plurality of processors. Alternatively, the arithmetic processing device 40 may be configured by only the hardware.

A classifier 42 of the arithmetic processing device 40 is configured to receive the third image IMGc as an input, and to determine the position and type of the object OBJ contained therein. The classifier 42 is implemented based on a model generated by the machine learning. An algorithm of the classifier 42 is not particularly limited but YOLO (You Only Look Once) and SSD (Single Shot MultiBox Detector), R-CNN (Region-based Convolutional Neural Network), SPPnet (Spatial Pyramid Pooling), Faster R-CNN, DSSD (Deconvolution-SSD), Mask R-CNN and the like may be adopted. Alternatively, algorithms to be developed in future may also be adopted.

Figure 2:
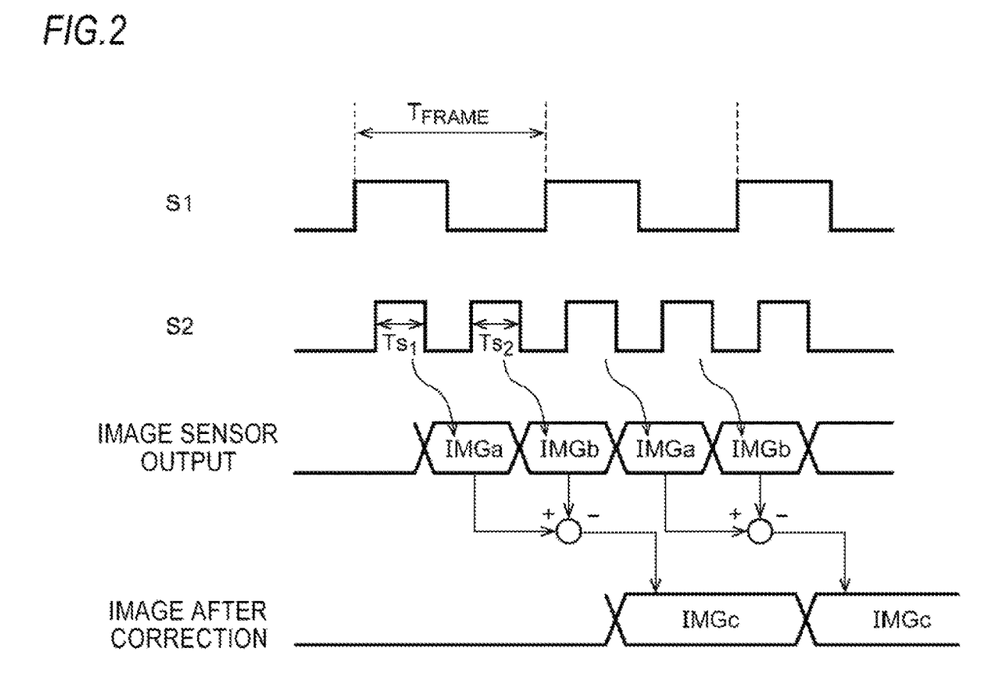
FIG. 2 is a timing chart for illustrating operations of the object identification system shown in FIG. 1.

The configuration of the object identification system 10 is as described above. Subsequently, operations thereof will be described. FIG. 2 is a timing chart for illustrating operations of the object identification system 10 shown in FIG. 1.

During one frame period $T_{FRAME}$, the light projecting timing signal S1 has a high time period and a low time period. The high time period is a light emitting time period of the light projector 72, and the low time period is a non-light emitting time period of the light projector 72.

The capturing timing signal S2 becomes high for each of the high time period and the low time period of the light projecting timing signal S1, and the capturing by the image sensor 74 is thus instructed. A shutter speed (light exposure time) Ts1 in the light emitting state and a shutter speed Ts2 in the non-light emitting state may be the same or different from each other.

From the image sensor 74, the first image IMGa and the second image IMGb are alternately output. When a pair of two images IMGa and IMGb are obtained, the first image IMGa is corrected using the second image IMGb. This correction may be performed most simply by subtraction of the pixel values and is expressed such as IMGa−IMGb. Then, the image IMGc after the correction is output every frame period $T_{FRAME}$.

The operations of the object identification system 10 are as described above. Subsequently, advantages thereof will be described.

The first image IMGa captured in the light emitting state of the probe light L1 contains the reflected light L2 and the disturbance noise (the components L3 and L4 of the environment light). On the other hand, the second image IMGb captured in the non-light emitting state of the probe light L1 contains only the disturbance noise. Therefore, when a difference thereof is taken, the influence of the disturbance noise can be reduced and the noise resistance can be improved.

Also, in the related-art technique, since the image data input to the learned classifier 42 contains the disturbance noise originating from the environment light, the classifier 42 is required to have an ability to accurately determine the object OBJ, irrespective of an amount of the disturbance noise. Therefore, for the machine learning of the classifier 42, it is necessary to collect images (learning data) captured while changing an illuminance and a color temperature of the environment light.

In contrast, when the active sensor 70 of the first embodiment is used, the disturbance noise contained in the image data to be input to the classifier 42 is largely reduced. This means that an influence of the disturbance noise on the model of the classifier 42 is reduced. Therefore, the labor, time and cost to be consumed for the collection of the learning data can be reduced.

Subsequently, modified embodiments of the first embodiment will be described.

Modified Embodiment 1.1

Figure 3:
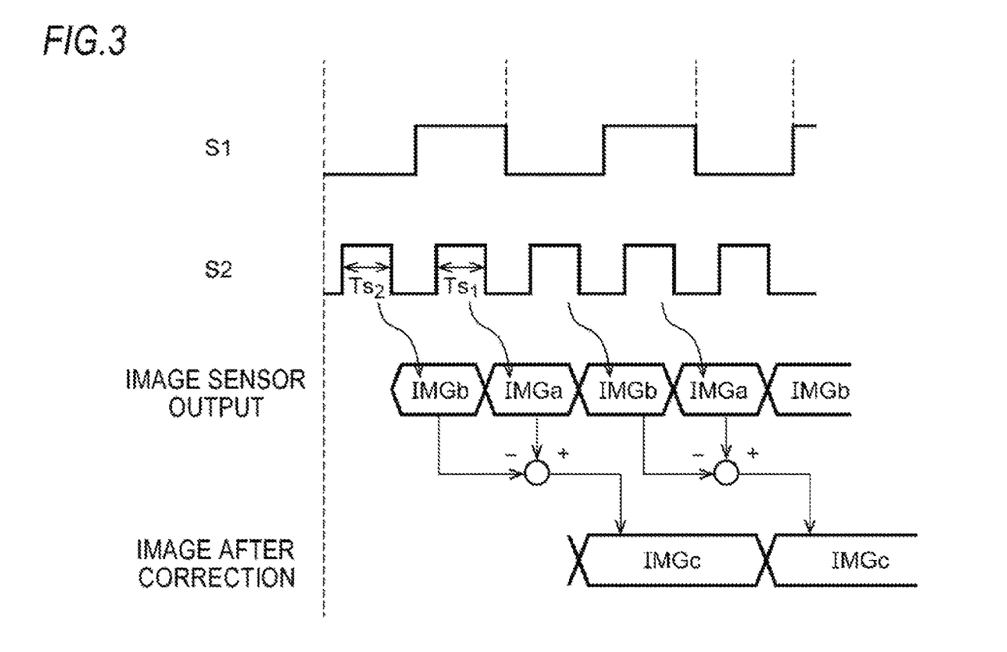
FIG. 3 is a timing chart for illustrating operations of the object identification system according to a modified embodiment 1.1.

FIG. 3 is a timing chart for illustrating operations of the object identification system 10 according to a modified embodiment 1.1. In the modified embodiment 1.1, the second image IMGb in the non-light emitting state is first obtained and the first image IMGa in the light emitting state is then obtained.

Modified Embodiment 1.2

Figure 4:
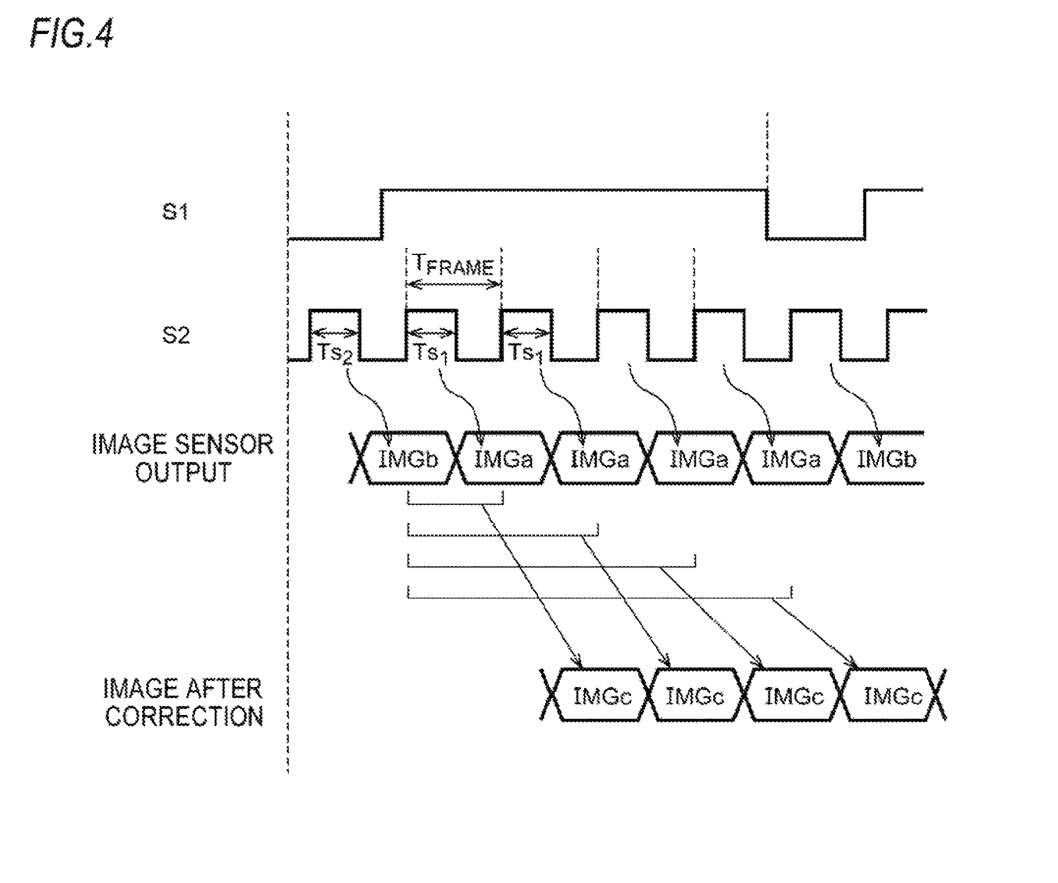
FIG. 4 is a timing chart for illustrating operations of the object identification system according to a modified embodiment 1.2.

In the first embodiment, the second image IMGb is obtained each time when the first image IMGa is obtained. However, the present disclosure is not limited thereto. FIG. 4 is a timing chart for illustrating operations of the object identification system according to a modified embodiment 1.2. In the modified embodiment 1.2, the second image IMGb for correction is captured once for several frames (here, five frames). According to the modified embodiment 1.2, the frame period can be shortened as compared to the embodiment shown in FIG. 2.

Modified Embodiment 1.3

Alternatively, the images obtained by performing the image capturing more than once in the non-light emitting state may be averaged (or added) to generate the second image IMGb.

Modified Embodiment 1.4

In the first embodiment, the active sensor 70 includes the correction unit 78. However, the present disclosure is not limited thereto. The active sensor 70 may be configured to output a pair of the first image IMGa and the second image IMGb, and the function of the correction unit 78 may be executed by the arithmetic processing device 40.

Modified Embodiment 1.5

In the light emitting state and the non-light emitting state, the exposure of the image sensor 74 may be different. In this case, the first image IMGa and the second image IMGb may be sensitized or desensitized by image processing such that the exposure becomes the same, and the subtraction processing may be executed in a state in which the exposure becomes the same.

Second Embodiment

Figure 5:
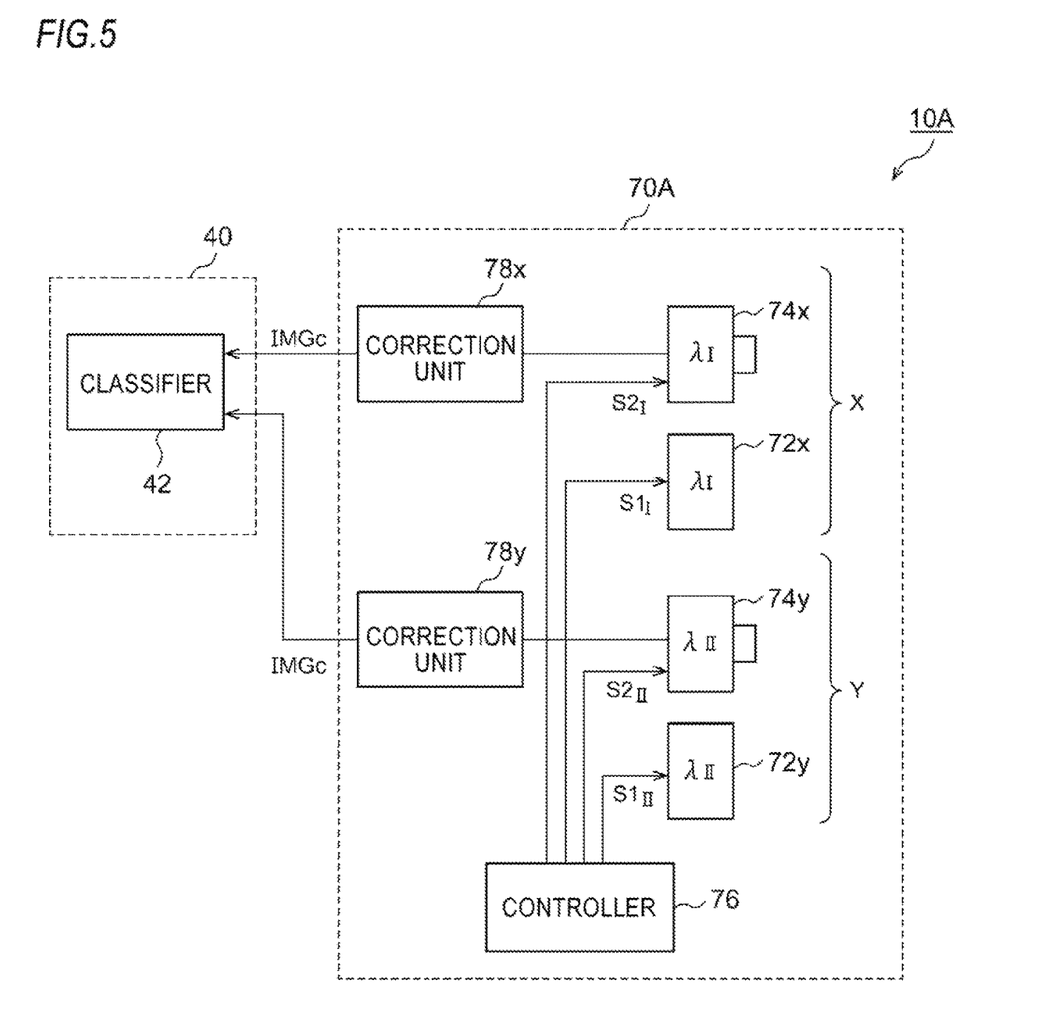
FIG. 5 is a block diagram of an object identification system according to a second embodiment.

FIG. 5 is a block diagram of an object identification system 10A according to a second embodiment. The object identification system 10A includes the arithmetic processing device 40 and an active sensor 70A. The active sensor 70A includes two sets X and Y, each including the light projector 72 and the image sensor 74. In the first set X and the second set Y, wavelengths are different from each other. In the first set X, the light projector 72x is configured to emit probe light having a first wavelength $\lambda_I$, and the image sensor 74x is sensitive to the first wavelength $\lambda_I$ but is insensitive to a second wavelength $\lambda_{II}$. In the second set Y, the light projector 72y is configured to emit probe light having a second wavelength $\lambda_{II}$, and the image sensor 74y is sensitive to the second wavelength $\lambda_{II}$ but is insensitive to the first wavelength $\lambda_I$.

Figure 6:
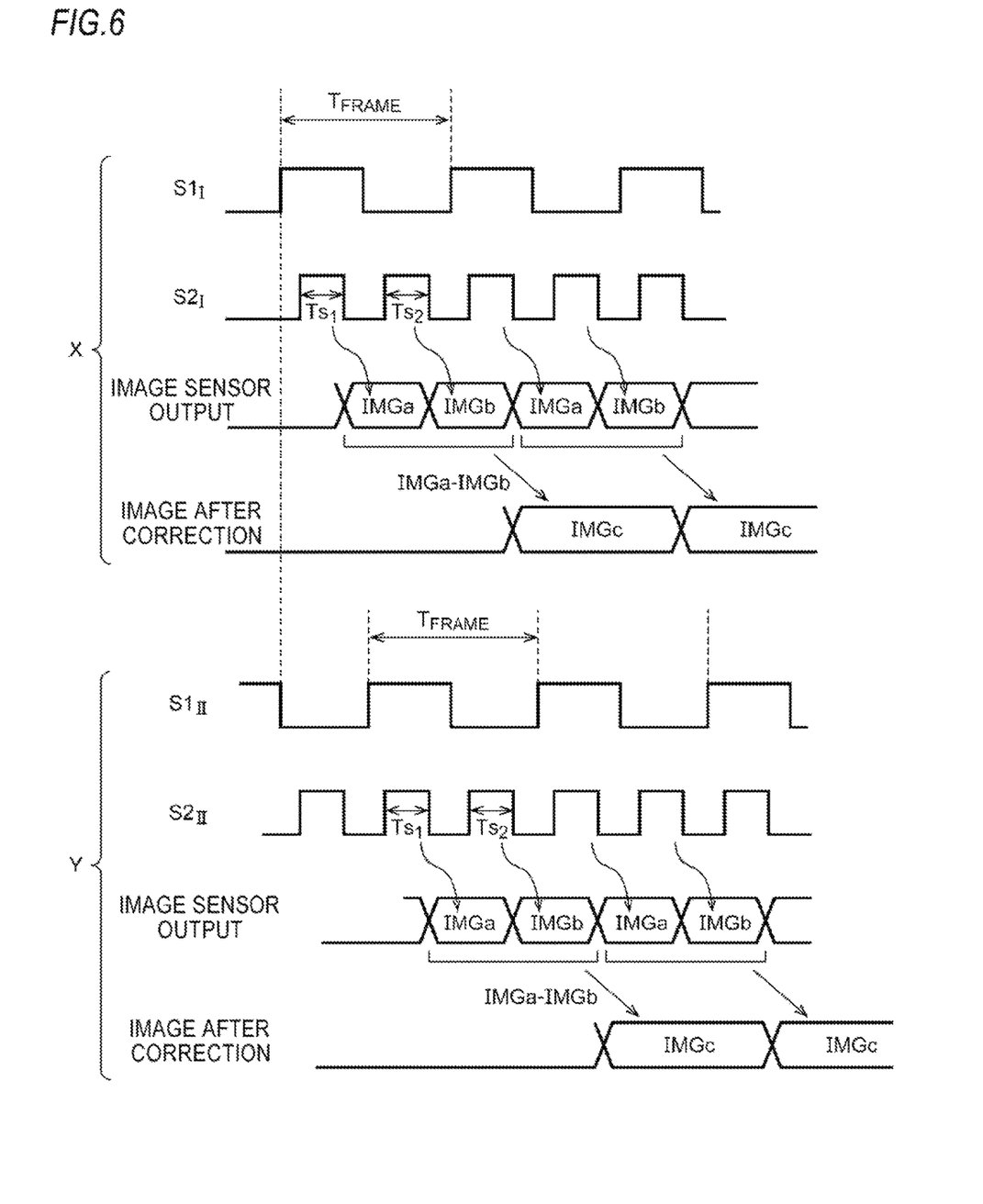
FIG. 6 is a timing chart for illustrating operations of the object identification system shown in FIG. 5.

FIG. 6 is a timing chart for illustrating operations of the object identification system shown 10A in FIG. 5. The two sets operate in a complementary manner. Specifically, the light emitting state of the first set X is the non-light emitting state of the second set Y, and the non-light emitting state of the first set X is the light emitting state of the second set Y. Thereby, two images IMGc can be obtained for an operation period (frame period) $T_{FRAME}$ of each set, so that the effective frame rate can be increased.

In the meantime, only one of the two sets X and Y may be selected and enabled to operate. For example, one set in which the identification rate of the classifier 42 is higher may be selected from the two sets X and Y and enabled to operate, in correspondence to the state (spectrum) of the environment light.

Third Embodiment

Figure 7:
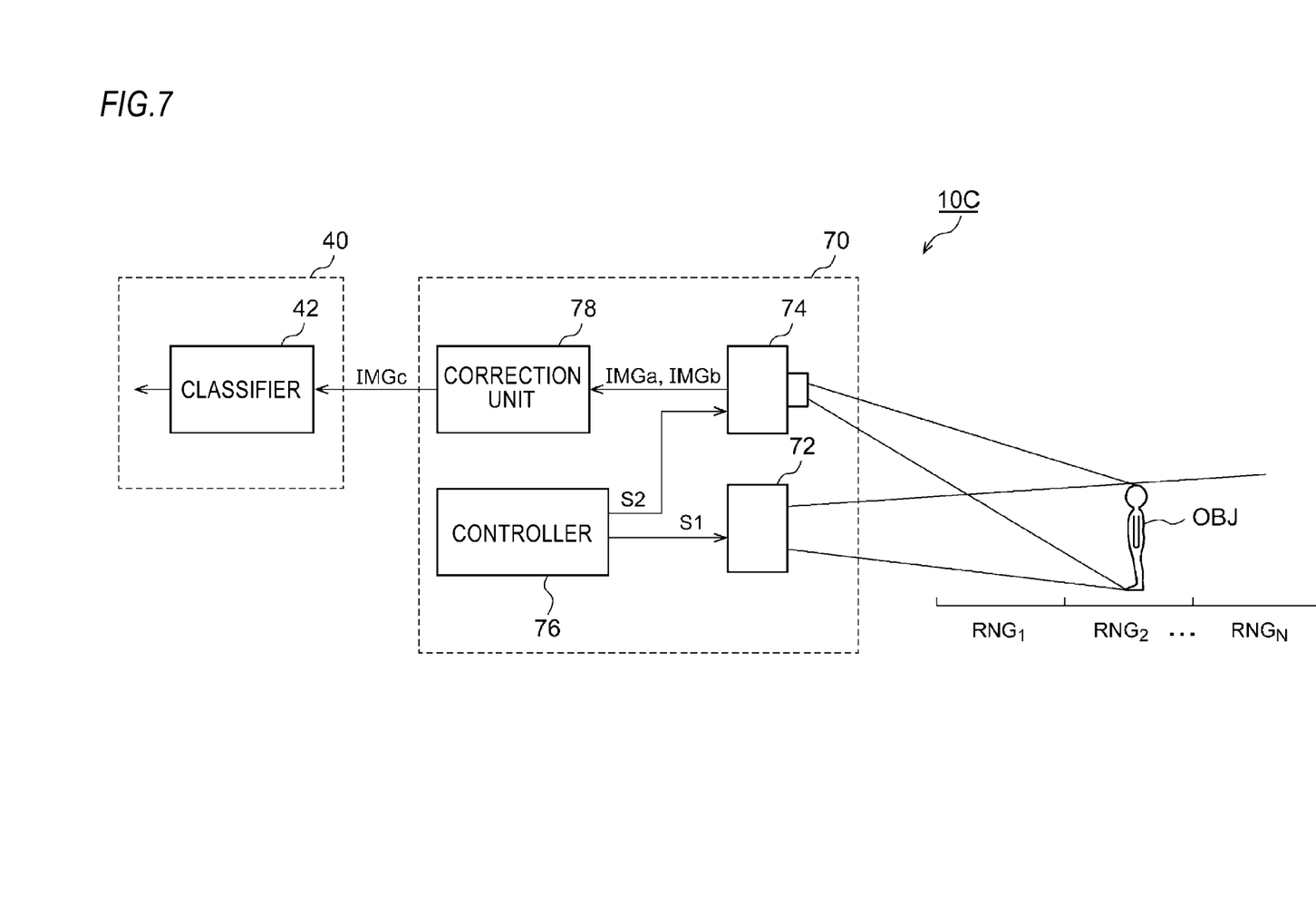
FIG. 7 illustrates an object identification system according to a third embodiment.

FIG. 7 illustrates an object identification system 10C according to a third embodiment. An active sensor 70C is a gating camera. A plurality of N (N≥2) ranges $RNG_1$ to $RNG_N$ is defined in a depth direction, and the image capturing is performed every each range by the gating camera 70C. The ranges adjacent to each other may overlap in the depth direction at a boundary therebetween.

The controller 76 is configured to change a time difference between the light projection by the light projector 72 and the light exposure of the image sensor 74 every each range RNG by changing the light projecting timing signal S1 and the capturing timing signal S2. The gating camera 70C is configured to generate a plurality of first images $IMGa_1$ to $IMGa_N$ corresponding to the plurality of ranges $RNG_1$ to $RNG_N$. In the i-th first image $IMGa_i$, only an object contained in the corresponding range $RNG_i$ is captured.

Figure 8:
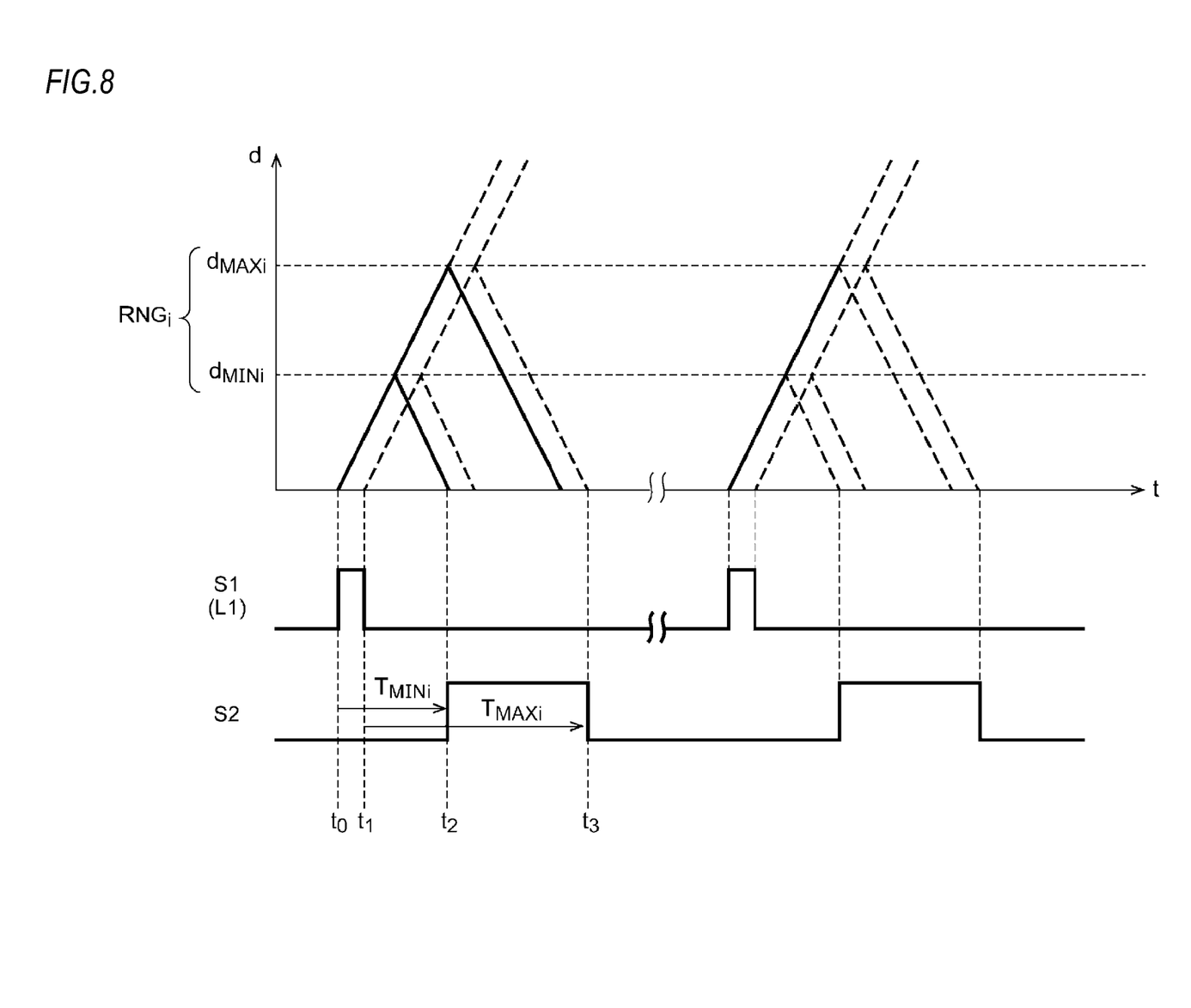
FIG. 8 illustrates operations of a gating camera.

FIG. 8 illustrates operations of the gating camera 70C. FIG. 8 illustrates a situation where the i-th range $RNG_i$ is measured. The light projector 72 emits light for the light emitting time period $\tau_1$ from time $t_0$ to $t_1$, in synchronization with the light projecting timing signal S1. On the top part, a diagram of a light beam in which the horizontal axis indicates time and the vertical line indicates a distance is shown. A distance from the gating camera 70C to a boundary immediately before the range $RNG_i$ is denoted as $d_{MINi}$, and a distance to an inner boundary of the range $RNG_i$ is denoted as $d_{MAXi}$.

A roundtrip time $T_{MINi}$ after light starting from the light projector 72 at a certain time reaches the distance $d_{MINi}$ until reflected light thereof returns to the image sensor 74 is as follows.

$$T_{MINi}=2\times d_{MINi}/c, \text{ where } c \text{ is speed of light.}$$

Similarly, a roundtrip time $T_{MAXi}$ after light starting from the light projector 72 at a certain time reaches the distance $d_{MAXi}$ until reflected light thereof returns to the image sensor 74 is as follows:

$$T_{MAXi}=2\times d_{MAXi}/c$$

When it is intended to capture only the object OBJ contained in the range $RNG_i$, the controller 76 generates the capturing timing signal S2 so as to start light exposure at time $t_2=t_0+T_{MINi}$, and to complete the light exposure at time $t_3=t_1+T_{MAXi}$. This is one light exposure operation.

When capturing the i-th range $RNG_i$, a plurality of light exposures may also be performed. In this case, the controller 76 may repeat a plurality of the light exposure operations with a predetermined period $\tau_2$.

Figure 9A:
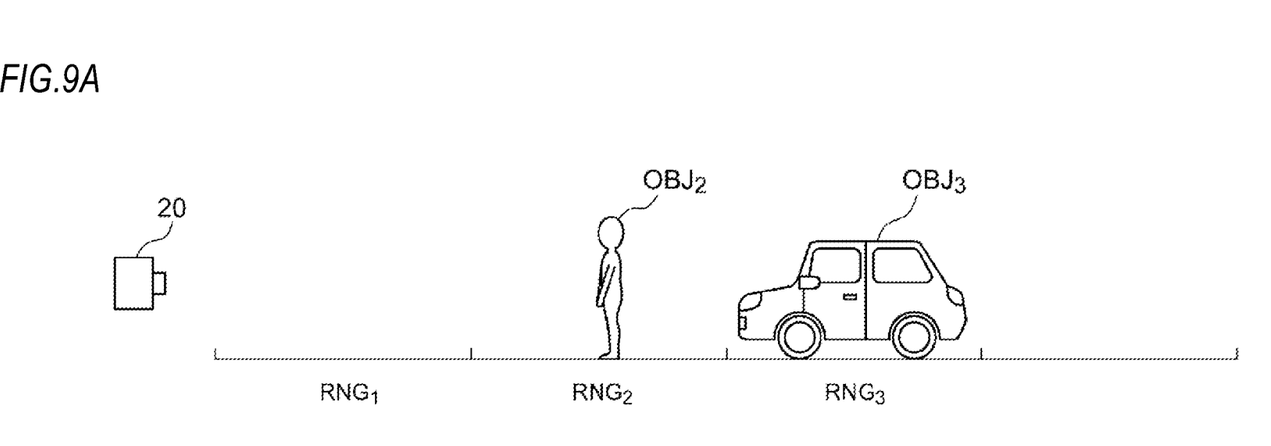
FIGS. 9A and 9B illustrate a plurality of images obtained by the gating camera.
Figure 9B:
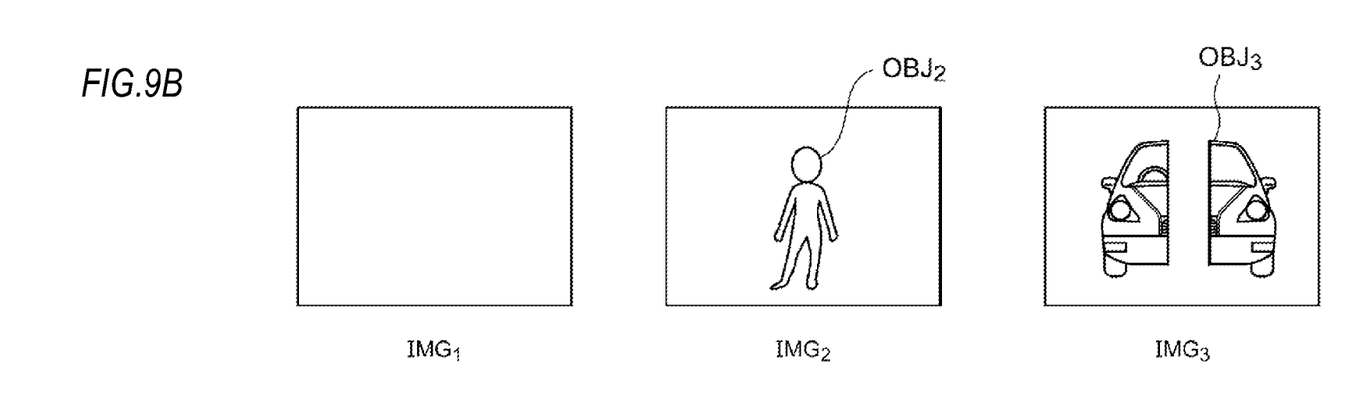

FIGS. 9A and 9B illustrate a plurality of images obtained by the gating camera 70C. In the example of FIG. 9A, an object (pedestrian) $OBJ_2$ is present in the range $RNG_2$, and an object (vehicle) $OBJ_3$ is present in the range $RNG_3$. FIG. 9B illustrates a plurality of first images $IMGa_1$ to $IMGa_3$ obtained in the situation of FIG. 9A. When capturing the image $IMGa_1$, since the image sensor is light-exposed only by the reflected light from the range $RNG_1$, no object is captured in the image $IMGa_1$.

When capturing the image $IMGa_2$, since the image sensor is light-exposed only by the reflected light from the range $RNG_2$, only the object $OBJ_2$ is captured in the image $IMGa_2$. Similarly, when capturing the image $IMGa_3$, since the image sensor is light-exposed only by the reflected light from the range $RNG_3$, only the object $OBJ_3$ is captured in the image $IMGa_3$. In this manner, the gating camera 70C can separately capture the object every each range.

Figure 10:
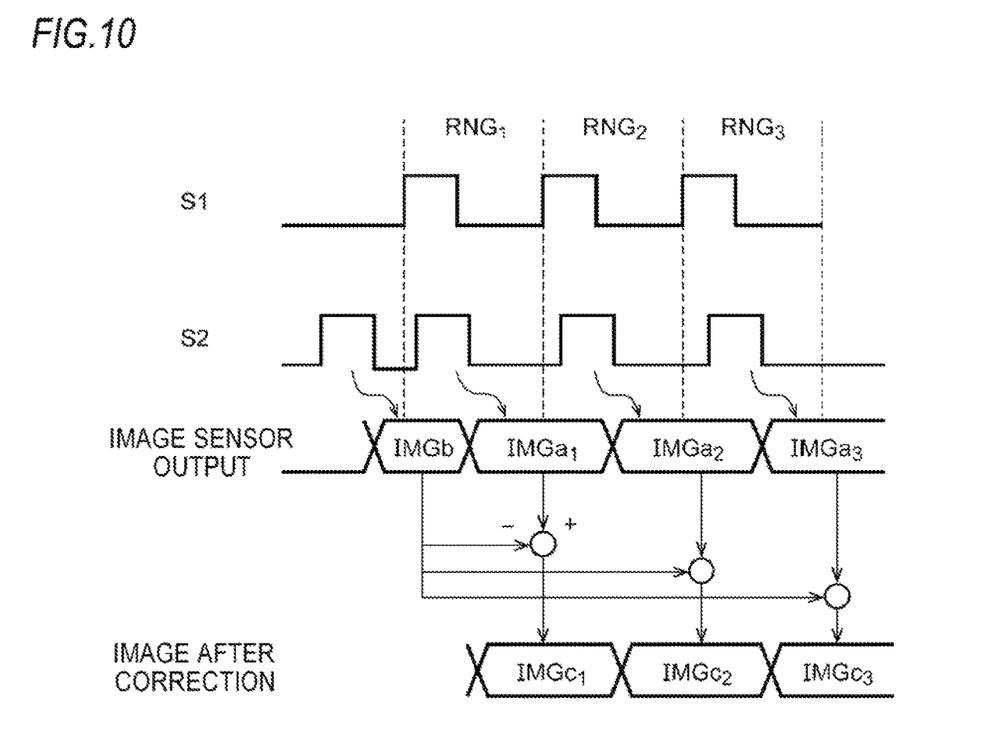
FIG. 10 is an operation waveform diagram of the object identification system shown in FIG. 7.

The configuration of the object identification system 10C is as described above. Subsequently, operations thereof will be described. FIG. 10 is an operation waveform diagram of the object identification system 10C shown in FIG. 7. In FIG. 10, the second image IMGb is first captured by one and is shared in the plurality of ranges. In the meantime, the second image IMGb may be captured every each range.

Figure 11:
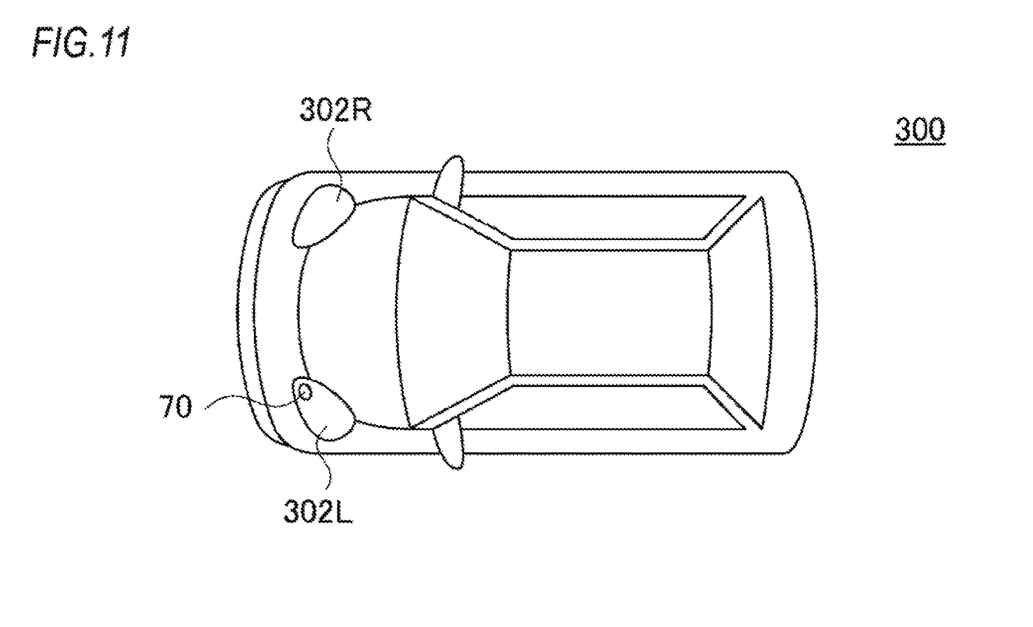
FIG. 11 illustrates an automobile having an object identification system.

FIG. 11 illustrates an automobile having the object identification system 10. The automobile 300 has headlamps 302L and 302R. The object identification system 10 is provided in at least one of the headlamps 302L and 302R. The headlamp 302 is located at a front end of a vehicle body, and is most advantageous as a provision place of the active sensor 70 when capturing a surrounding object.

Figure 12:
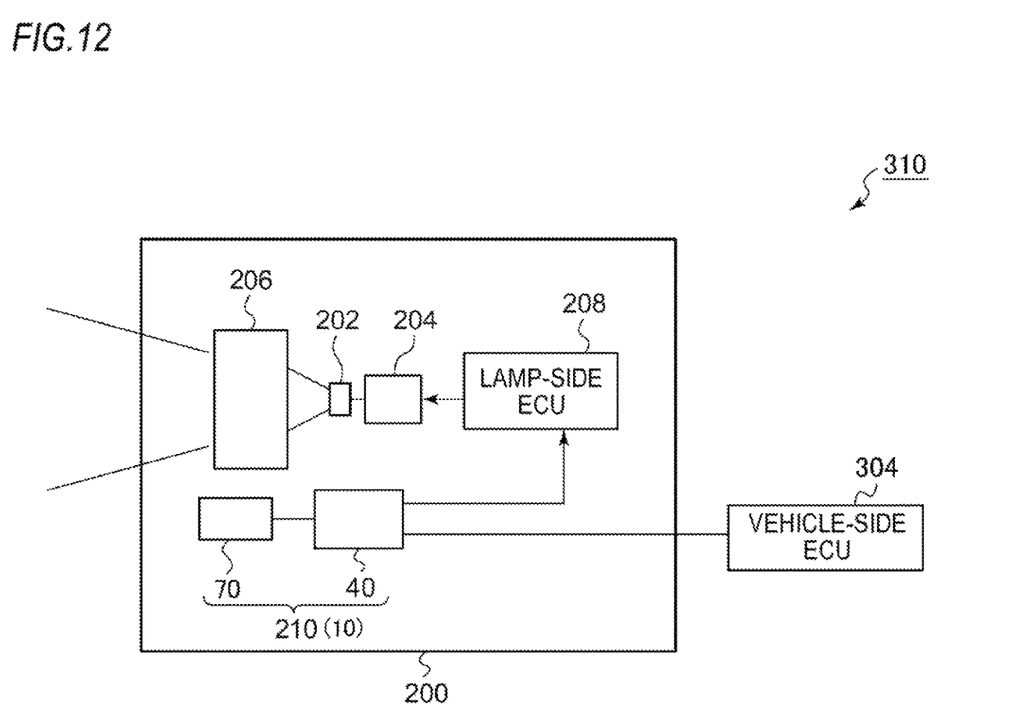
FIG. 12 is a block diagram illustrating a vehicle lamp having an object identification system.

FIG. 12 is a block diagram illustrating a vehicle lamp 200 including an object identification system 210. The vehicle lamp 200 configures a lamp system 310, together with a vehicle-side ECU 304. The vehicle lamp 200 includes a light source 202, a lighting circuit 204, and an optical system 206. The vehicle lamp 200 further includes an object identification system 210. The object identification system 210 corresponds to the above-described object identification system 10, and includes the active sensor 70 and the arithmetic processing device 40.

Information about the object OBJ detected by the arithmetic processing device 40 may also be used for light distribution control of the vehicle lamp 200. Specifically, a lamp-side ECU 208 is configured to generate an appropriate light distribution pattern based on the information about the type and position of the object OBJ generated by the arithmetic processing device 40. The lighting circuit 204 and the optical system 206 are configured to operate such that the light distribution pattern generated by the lamp-side ECU 208 is to be obtained.

Also, the information about the object OBJ detected by the arithmetic processing device 40 may be transmitted to the vehicle-side ECU 304. The vehicle-side ECU may be configured to perform automatic driving, based on the corresponding information.

Although the present disclosure has been described using the specific expressions with reference to the embodiments, the embodiments merely illustrate an aspect of the principle and application of the inventive concept of the present disclosure. The embodiments can be modified and can be changed in terms of arrangement without departing from the spirit of the present disclosure defined in the claims.

The invention claimed is:

1. An active sensor comprising:
   at least a first light projector configured to emit probe light; and
   at least a first image sensor,
   wherein the active sensor is configured to obtain a first image in a light emitting state of the first light projector and a second image in a non-light emitting state of the first light projector,
   wherein the active sensor is configured to create a third image, by correcting the first image with the second image,
   wherein the third image is created by only subtracting a pixel value of a corresponding pixel of the second image from each pixel of the first image,
   wherein the active sensor further comprises a first set of the first light projector and the first image sensor, and a second set of a second light projector and a second image sensor, wherein the first set and the second set are configured to emit and detect different wavelengths, and wherein the two sets are configured to operate in a complementary manner.

2. The active sensor according to claim 1, further comprising:
a controller configured to control a light emitting timing of the light projector and a light exposure timing of the image sensor.

3. The active sensor according to claim 1,
wherein the active sensor includes a gating camera configured to define a plurality of ranges in a depth direction and obtain a plurality of images corresponding to the plurality of ranges by changing a time difference between light emission and image capturing for each of the ranges.

4. The active sensor according to claim 3,
wherein the second image is commonly obtained for the plurality of ranges.

5. The active sensor according to claim 3,
wherein the second image is obtained for each of the ranges.

6. The active sensor according to claim 1,
wherein a wavelength of the probe light is infrared or ultraviolet.

7. An object identification system comprising:
the active sensor according to claim 1; and
an arithmetic processing device configured to identify a type of an object based on an image obtained by the active sensor.

8. A vehicle lamp comprising the object identification system according to claim 7.

9. A vehicle comprising the object identification system according to claim 7.

* * * * *